UNITED STATES PATENT OFFICE.

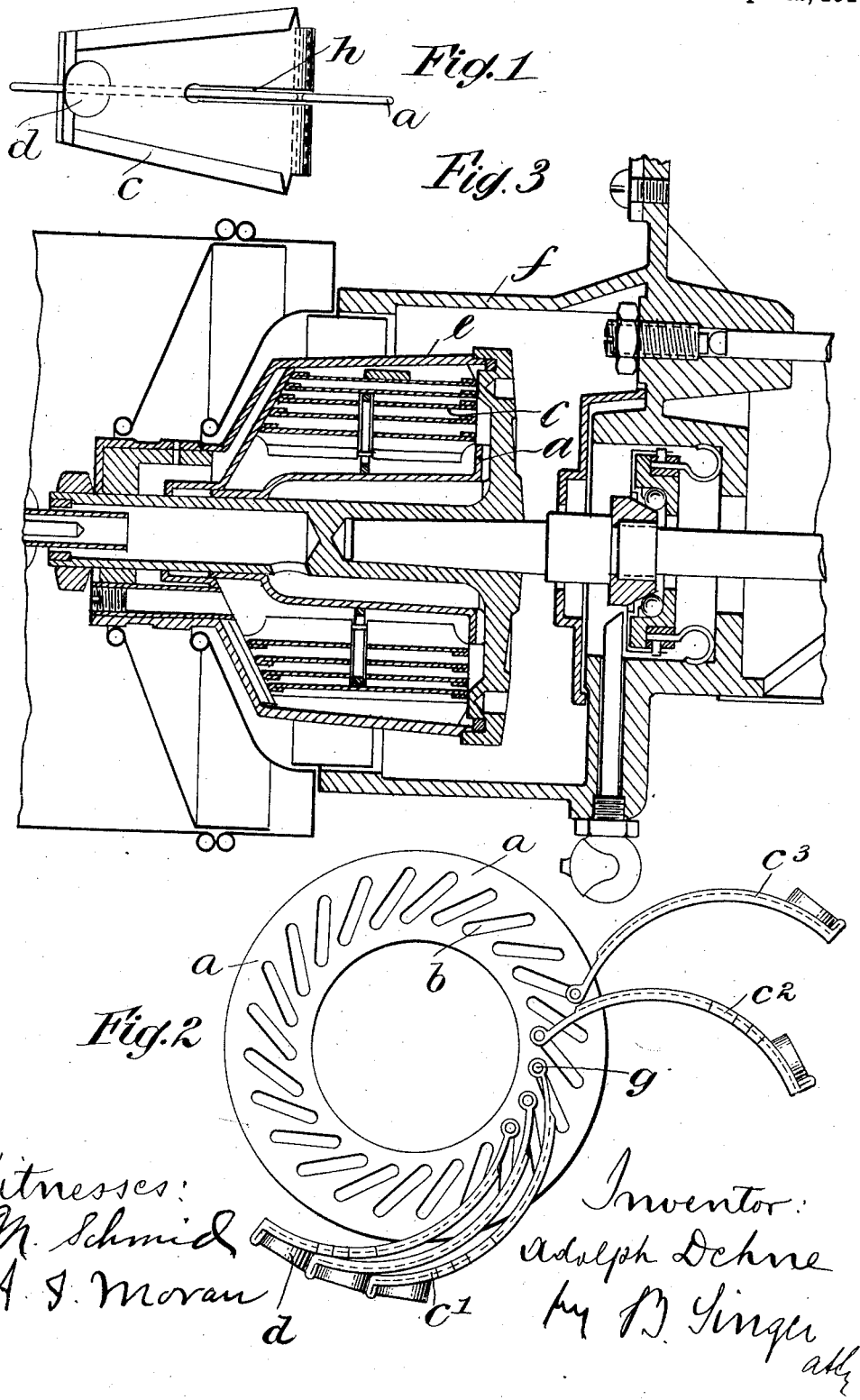

ADOLPH DEHNE, OF FRANKFORT-ON-THE-ODER, GERMANY.

CENTRIFUGAL CREAM-SEPARATOR.

1,002,970. Specification of Letters Patent. Patented Sept. 12, 1911.

Application filed April 17, 1911. Serial No. 621,551.

*To all whom it may concern:*

Be it known that I, ADOLPH DEHNE, manufacturer, a citizen of the German Empire, residing at Frankfort-on-the-Oder, in the Kingdom of Prussia, German Empire, have invented certain new and useful Improvements in Centrifugal Cream-Separators; and I do hereby declare the following to be a full, clear, and exact description of the invention, such as will enable others skilled in the art to which it appertains to make and use the same.

My invention relates to improvements in centrifugal cream separators, and more particularly in cream separators of that class in which a body provided with wings or blades is located within the drum and rotates with the latter, and provides between its wings radial or spiral chambers for the milk within which the cream is separated and through which the separated cream moves toward the central portion of the drum and to the apparatus for withdrawing the same from the drum. In centrifugal machines of this class the wings or blades are mounted on a ring, and they are either rigidly secured to the said ring, or have a swinging support thereon, or they are loosely mounted thereon. In machines in which the wings are rigidly secured to the ring their number can be but small, whereby the separation of the cream is imperfect. If the number of the wings is increased, the distance of the wings from one another is so small, that the chambers or passages formed thereby can not be thoroughly cleaned. In machines in which the wings or blades swing about stationary pivots the latter are disposed so close to one another, that they can not be cleaned and the pivots are always full of impurities. Where the wings are loosely mounted on the rings the machine can be thoroughly cleaned. But the correct position of the said wings on one another, can not be secured in the operation of the machine, so that the rotation of the drum is irregular.

The object of the improvements is to construct the ring and its blades in such a way, that they can easily be cleaned, while in the operation of the machine the wings assume the correct positions. With this object in view the wings are mounted on pivots, and the said pivots are adapted to be displaced on the ring.

In order that my invention may more clearly be understood an example embodying the same has been shown in the accompanying drawing in which the same letters of reference have been used in all the views to indicate corresponding parts.

In said drawing Figure 1, is a side view of the ring with a single wing mounted thereon in the position in which it is put to use, Fig. 2, is a plan of the ring with several wings mounted thereon and others removed, a part of the wings being shown in the position which they assume when the machine is put to use and other wings being shown in the out of use position in which the apparatus can be cleaned, and Fig. 3, is a vertical cross-section of a complete machine provided with the ring and wings.

Referring to the example illustrated in the drawing, the rotary drum $e$ is mounted within a casing $f$. These parts, and the means for withdrawing the cream and the milk from which the cream has been separated are of any known or preferred construction and need no detailed description.

Located within the drum and rotating therewith is a ring $a$ which serves as a support for a plurality of wings $c$. The ring $a$ is formed with a plurality of slits $b$ one for each of the wings. These slits extend from a portion of the ring near the inner circumference toward the outer circumference thereof. While the direction of the slits is not necessarily that shown in the drawing, I prefer to arrange the same in a direction at an angle to the radius of the ring, as is shown in Fig. 2. In the example illustrated in the drawing each of the wings $c$ is curved, and it is formed at its inner side with a horizontal slot $h$ which extends from the inner margin substantially to the middle of the ring. With the said slot the wing is adapted to embrace the ring $a$, the lower wall of the slot being located below the surface of the ring, and the upper wall of the slot being located above the said ring. At their inner ends the wings are provided with pivot bolts $g$ which pass through the slits $b$. Near their outer ends the wings are provided with lugs $d$ which in the normal position of the wings bear against the ends of the adjacent wings and thereby hold the wings in position.

In Fig. 2 I have shown the wings in various positions. The wings which have been indicated by the letter $c^1$ are in the position in which they are set when the machine is operated. The wing indicated by the letter $c^2$ has been turned about its pivot, and the wing which has been indicated by the letter $c^3$ has been turned about its pivot and shifted with its inner end away from the inner circumference and to the outer circumference of the ring. From this position of the wing it will readily be understood, that the whole body can thoroughly be cleaned within a minimum of time. For closing the body the wings are shifted inward and turned about their pivots, and they are held in this position by the lugs $d$.

I claim herein as my invention:

1. In a centrifugal separator, the combination with a rotary drum, a supporting element mounted within said drum, and wings pivotally mounted on said supporting element and adapted to be shifted with their pivots from the inner portion of said supporting element to the outer portion thereof.

2. In a centrifugal separator, the combination with a rotary drum, a supporting element mounted within said drum, and having slits extending from the inner portion of said supporting element to the outer portion thereof, and wings pivotally mounted on said supporting element, the pivots of the wings extending through said slits.

3. In a centrifugal separator, the combination with a rotary drum, a supporting element mounted within said drum, wings pivotally mounted on said supporting element and adapted to be shifted with their pivots from the inner portion of said supporting element to the outer portion thereof, and lugs at the outer ends of said wings and bearing in the normal position of the wings against adjacent wings.

In testimony whereof I hereunto affix my signature in the presence of two witnesses.

ADOLPH DEHNE.

Witnesses:
HENRY HASPER,
WOLDEMAR HAUPT.

---

Copies of this patent may be obtained for five cents each, by addressing the "Commissioner of Patents, Washington, D. C."